United States Patent
Gauravaram (10) Patent No.: US 10,225,087 B2
(45) Date of Patent: Mar. 5, 2019

(54) METHODS AND SYSTEMS FOR RANDOMIZED MESSAGE GENERATION FOR CRYPTOGRAPHIC HASH FUNCTIONS

(71) Applicant: Tata Consultancy Services Limited, Mumbai (IN)

(72) Inventor: Praveen Gauravaram, Madhapur (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 14/852,991

(22) Filed: Sep. 14, 2015

(65) Prior Publication Data
US 2016/0080146 A1   Mar. 17, 2016

(30) Foreign Application Priority Data
Sep. 12, 2014   (IN) .......................... 2916/MUM/2014

(51) Int. Cl.
*H04L 29/06* (2006.01)
*H04L 9/32* (2006.01)

(52) U.S. Cl.
CPC .................................. *H04L 9/3236* (2013.01)

(58) Field of Classification Search
CPC ... H04L 9/3236; H04L 9/0825; H04L 9/0662; H04L 9/0869
USPC .......................................................... 380/46
See application file for complete search history.

(56) References Cited

U.S. PATENT DOCUMENTS

| | | | | |
|---|---|---|---|---|
| 5,113,444 A | * | 5/1992 | Vobach | H04L 9/0631 380/28 |
| 5,937,066 A | * | 8/1999 | Gennaro | H04L 9/0841 380/286 |
| 6,370,247 B1 | * | 4/2002 | Takaragi | H04L 9/0643 380/28 |
| 6,445,797 B1 | * | 9/2002 | McGough | H04L 9/0631 380/262 |
| 2004/0252836 A1 | * | 12/2004 | Yoshida | H04L 9/0643 380/268 |
| 2010/0166174 A1 | * | 7/2010 | Ghouti | H04L 9/0643 380/28 |

OTHER PUBLICATIONS

Halevi, Shai, and Hugo Krawczyk. "Strengthening digital signatures via randomized hashing." Annual International Cryptology Conference. Springer Berlin Heidelberg, 2006.*

(Continued)

*Primary Examiner* — Syed A Zaidi
(74) *Attorney, Agent, or Firm* — Schwegman Lundberg & Woessner, P.A.

(57) ABSTRACT

Methods and systems for generation of randomized messages for cryptographic hash functions are described herein. The method includes obtaining a random value in a binary bit form for randomizing a message. The method also includes splitting the message into multiple message blocks, where a length of each of the multiple message blocks is based on a length of the random value and a block length of a compression function. The method further includes prepending and appending each of the multiple message blocks with at least a portion of the random value and concatenating the prepended and appended message blocks to obtain a message envelope for generating the randomized message.

10 Claims, 3 Drawing Sheets

(56) References Cited

OTHER PUBLICATIONS

Damgard, Ivan Bjerre, "A Design Principle for Hash Functions", Advances in Cryptology, Proceedings Crypto '89, LNCS 435, G. Brassard, Ed., Springer-Verlag, 1990, pp. 416-427, (1990), 416-427.

Merkle, Ralph C., "One Way Hash Functions and DES", Advances in Cryptology, Proceedings Crypto '89, LNCS 435, G. Brassard, Ed., Springer-Verlag, 1990, pp. 428-446., (1990), 428-446.

* cited by examiner

METHODS AND SYSTEMS FOR RANDOMIZED MESSAGE GENERATION FOR CRYPTOGRAPHIC HASH FUNCTIONS

CLAIM OF PRIORITY

The present application also claims benefit from Indian Patent Application No. 2916/MUM/2014, filed on Sep. 12, 2014, the entirety of which is hereby incorporated by reference.

TECHNICAL FIELD

The present subject matter relates, in general, to information security and cryptography and, in particular, to generation of randomized message for cryptographic hash functions.

BACKGROUND

Cryptographic hash functions are commonly used for generating and verifying digital signatures, in order to provide integrity and authenticated access to digital data. A cryptographic hash function is applied on the digital data to generate a hash value, also referred to as message digest. The hash value is then signed, using a standard digital signature algorithm, together with the private key of a signer to generate a digital signature. The digital signature is attached to the digital data to obtain a digitally signed data. For verification of the digital signature, the digital data is passed through the same cryptographic hash function, used in the signature generation process, by a verifier to obtain the hash value. The digital signature from the digitally signed data is also passed through a digital signature verification algorithm along with the public key of the signer to obtain the hash value. If the hash values obtained from the hashing of digital data and the verification of the digital signature are identical, then the digital signature is verified to be a valid signature.

SUMMARY

This summary is provided to introduce aspects related to methods and systems for randomized message generation for cryptographic hash functions and the aspects are further described below in detailed description. This summary is not intended to identify essential features of the claimed subject matter nor is it intended for use in determining or limiting the scope of the claimed subject matter.

Methods and systems for randomized message generation for cryptographic hash functions are described for making the forging and repudiation of digital signature(s) computationally intensive and increase the degree of collision resistance for hash functions. In an embodiment, methods and systems for randomized message generation for cryptographic hash functions is disclosed.

In an aspect, there is provided a method for generating a randomized message for a cryptographic hash function that can include obtaining a random value in a binary bit form for randomizing a message; splitting the message into multiple message blocks, wherein a length of each of the multiple message blocks is based on a length of the random value and a block length of a compression function; prepending and appending each of the multiple message blocks with at least a portion of the random value and concatenating the prepended and appended message blocks to obtain a message envelope for generating the randomized message.

In another aspect, there is provided a system for randomized message generation for cryptographic hash functions comprising: a processor, a message envelope generator coupled to the processor to: obtain a random value in a binary bit form for randomizing a message; split the message into multiple message blocks, wherein a length of each of the multiple message blocks is based on a length of the random value and a block length of a compression function; prepend and append each of the multiple message blocks with at least a portion of the random value and concatenate the prepended and appended message blocks to obtain a message envelope for generating the randomized message.

In yet another aspect, there is provided a computer program product for executing a method for generating a randomized message for a cryptographic hash function, comprising a non-transitory computer readable medium having programmed instructions embodied therein for: obtaining a random value in a binary bit form for randomizing a message; splitting the message into multiple message blocks, wherein a length of each of the multiple message blocks is based on a length of the random value and a block length of a compression function; prepending and appending each of the multiple message blocks with at least a portion of the random value; and concatenating the prepended and appended message blocks to obtain a message envelope for generating the randomized message.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the figures to reference like features and components.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in a non-transitory computer readable medium and so executed by a computing device or processor, whether or not such computing device or processor is explicitly shown.

DETAILED DESCRIPTION

The present subject matter relates to methods and systems for generation of randomized messages for cryptographic hash functions, in order to secure digital information through digital signatures. A randomized message is understood as a message that is processed based on a random binary value before applying a cryptographic hash function. The message may be a digital document or data, which is to be digitally signed.

Cryptographic hash functions, also referred to as hash functions, may have to be collision resistant, i.e., resistant against a collision attack for maintaining security and preventing forgery of digital signatures. A hash function H can be considered to be collision resistant, and thus may not be subject to a collision attack, if it is difficult to find two distinct digital messages that hash to the same hash value. In other words, a hash function H is not collision resistant if it is possible to find two distinct digital messages a and b (a≠b) such that H(a)=H(b) with a computational complexity less than that for a birthday collision attack. For an n-bit hash function (i.e. size of hash value is n bits), the computational complexity of birthday collision attack is $2^{n/2}$. The collision attack refers to the act of finding the two distinct digital messages a and b, such that H(a)=H(b) and the computational complexity is less than that for the birthday collision attack. The degree of collision resistance for a hash function depends on the level of difficulty with which the two distinct digital messages a and b can be found.

Conventional hash functions, such as message digest algorithm (MD5) and secure hash algorithm-1 (SHA-1), are not collision resistant, and, thus, the digital signatures generated based on such non-collision resistant hash functions may be forged with substantial ease. In order to increase the degree of collision resistance for hash functions, and thus enhance the security of digital signatures, the digital messages are randomized using a random binary value, before applying the hash functions. The hash function that takes a randomized message as input is referred to as a randomized hash function, and the hash value generated based on the randomized digital message may be referred to as a randomized hash value.

In a conventional randomization [SP 800-106 2009] of a message m, the message m may be split into L equal sized message blocks $m_1, m_2, \ldots, m_L$. It may be understood that if the last message block $m_L$ is of a size less than the other message blocks, then the last message block $m_L$ is padded up with a number of 0's, such that the size of the last message block $m_L$ is equal to the other message blocks. Each of the message blocks is xored with the random binary value r, i.e., $m_1 \oplus r, m_2 \oplus r, \ldots, m_L \oplus r$. The xored message blocks are concatenated to obtain $m_1 \oplus r \| m_2 \oplus r \| \ldots \| m_L \oplus r$, and the concatenated message is prefixed with the random binary value r to obtain $r \| m_1 \oplus r \| m_2 \oplus r \| \ldots \| m_L \oplus r$. The hash function H may then be applied on the prefixed concatenated message to obtain the randomized hash value H $(r \| m_1 \oplus r \| m_2 \oplus r \| \ldots \| m_L \oplus r)$.

With such a randomization of a message, a signer who may be in possession of the binary random value r can mount a collision attack on the hash function H. Since collision attacks on the standard hash functions, such as MD5 and SHA-1, do not depend on the initial value used for message randomization, the signer can mount a collision attack on the hash function H from the initial state $f$ (IV, r), where IV is the initialization vector, r is the random binary value, and $f$ is the compression function. For this, with the random binary value r is possession, the signer can find a new initial state IV'=$f$ (IV, r). Based on the new initial state IV', the signer can find two distinct digital messages m'=m⊕r and n'=n⊕r, such that H (IV', m')=H (IV', n'). Such a collision attack, as described above, with the conventional randomization of a message may allow the signer to forge and then repudiate the digital signature, which adversely affects the security of the digital signed data.

The present subject matter describes methods and systems for generation of randomized messages for cryptographic hash functions in order to secure digital information through digital signatures. A randomized message is understood as a message that is processed based on a random binary value before applying a cryptographic hash function. The message may be a digital document or data, which is to be digitally signed. The messages may be randomized according to the present subject matter in order to increase the degree of collision resistance for hash functions in comparison to that with the conventional randomization methodologies. With the methods and systems for generation of randomized messages, according to the present subject matter, the forging of digital signatures by a signer or any third party is substantially computational intensive, even if the signer or the third party is in possession of the random binary value used for the randomization of messages. The methods and systems described herein can be implemented on computing devices, such as a server, a desktop, a laptop, a personal digital assistant, a smartphone, or the like.

In an implementation, a random value may be obtained for randomizing a message. The random value may be in a binary bit form. The message is split into multiple message blocks, such that the length of each message block is based on a length of the random value and a block length of a compression function of a cryptographic hash function. In an example, if the last message block is of a length smaller than the length of other message blocks, then the last message block is padded with a number of 0's, such that the length of the last message block is equal to that of other message blocks. After splitting the message, each of the multiple message blocks is prepended and appended with the random value. In an example, each message block is prepended and appended with at least a portion of the random value, such that the length of the prepended and appended message block is equal to the block length of the compression function. Further, the prepended and appended message blocks are concatenated to obtain a message envelope.

Further, in an implementation, the random value is concatenated to itself a predefined number of times to obtain a concatenated random value. The predefined number is such that the length of the concatenated random value is equal to the block length of the compression function. The concatenated random value is then prefixed to the message envelope.

Further, in an implementation, the message envelop is suffixed with a first predefined number of bits of the concatenated random value to generate the randomized message. The first predefined number of bits may be determined based on a number of bits for hash function padding and based on the length of the concatenated random value.

The randomization of messages, in accordance with the present subject matter, facilitates in increasing the degree of collision resistance for the hash functions, as it is computationally intensive to mount a collision attack, even if the signer or the third party is in possession of the random value used for message randomization. This substantially reduces the possibility of successful collision attacks on the hash functions by the signer or any third party, and thus reduces the chances of forgery and repudiation of digital signatures by the signer or the third party.

The signer or the third party may mount an offline collision attack on the hash function where the random value used for message randomization is not known, or may mount a collision attack on the hash function when the random value is known. It may be understood that even if a collision attack on the standard hash functions, such as MD5 and SHA-1, can be mounted based on any initial value, the initial state of the collision attack has to match $f$ (IV, r), where r is the random value used for message randomization. Thus, for the offline collision attack, the signer or the third party may have to find out, with high probability, the random value used for message randomization. Finding of the used random value, with high probability, is substantially computationally intensive. Thus, the signer or the third party may not be able to mount the offline collision attack for forging and repudiating the digital signature.

Further, in case the signer or the third party is in possession of the random value used for message randomization, the signer can find a new initial state $IV'=f(IV, r)$, and mount a collision attack on the hash function. However, with the randomization of message according to the present subject matter and the new initial state $IV'$, it is computationally expensive for a signer to find two distinct digital messages $m^*$ and $n^*$ based on the random value, such that $H(IV', m^*)=H(IV', n^*)$. Since each message block is prepended and appended with the random value, according to the present subject matter, in case of 1-block collision attack on the hash function, the messages $m^*$ and $n^*$ should have a differential characteristics of $(0\|\Delta\|0)$, where each 0 is zero difference bits for the random value and $\Delta$ is non-zero difference bits for the message block. Similarly, in case of 2-block collision attack on the hash function, the messages $m^*$ and $n^*$ should have a differential characteristics of $(0\|\Delta_1\|0)\| (0\|\Delta_2\|0)$, where each 0 is zero difference bits for the random value and $\Delta_1$ and $\Delta_2$ are non-zero difference bits for the two message blocks. These constraints of the differential characteristic may be substantially difficult to solve in order to determine $m^*$ and $n^*$ and mount a collision attack on the hash function, in accordance with the present subject matter. That is, an attacker who tries to find a collision should follow only specific differential characteristics due to the constraints posed by the message randomization which is unusual in the conventional collision finding attacks on the hash functions.

The methods and systems of present subject matter are further described in conjunction with the following figures. It should be noted that the description and figures merely illustrate the principles of the present subject matter. It will thus be appreciated that various arrangements that embody the principles of the present subject matter, although not explicitly described or shown herein, can be devised from the description and are included within its scope. Moreover, all statements herein reciting principles, aspects, and embodiments of the present subject matter, as well as specific examples thereof, are intended to encompass equivalents thereof.

Figure 1:
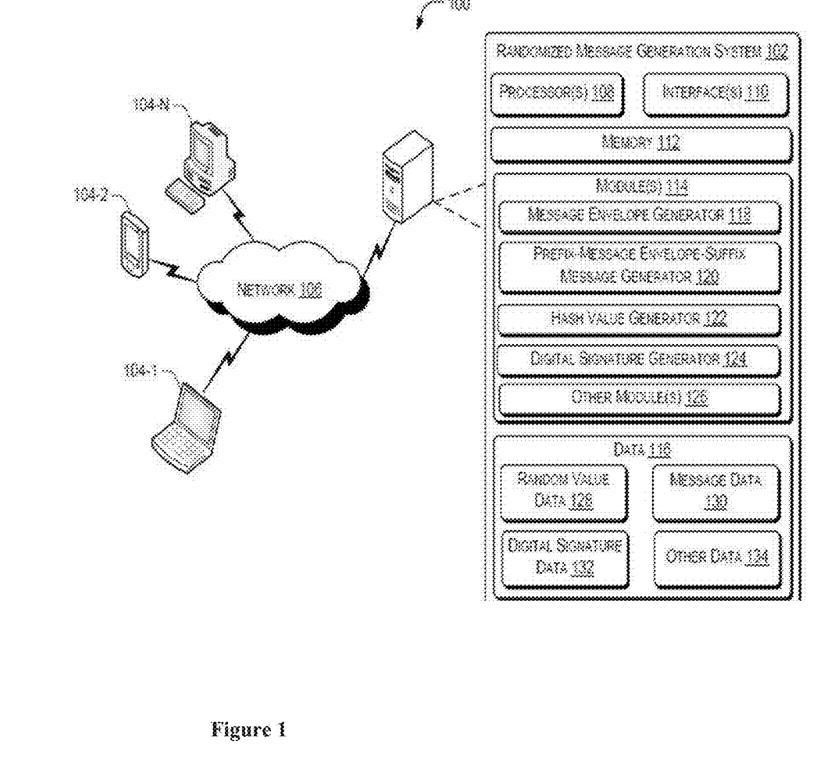
FIG. 1 illustrates a computing environment implementing a randomized message generation system, in accordance with an implementation of the present subject matter.

FIG. 1 illustrates a computing environment 100 implementing a randomized message generation system 102, in accordance with an implementation of the present subject matter. The randomized message generation system 102, hereinafter referred to as the system 102, is configured to generate randomized messages for cryptographic hash functions, such that the degree of collision resistance for the cryptographic hash functions is substantially increased and it may be substantially computationally intensive for a signer or a third party to forge and then repudiate digital signatures. The system 102 implemented in a computing device, such as a server, a desktop, a laptop, a personal digital assistant, a smartphone, or the like.

The system 102 may be coupled to one or more computing devices 104-1, 104-2, . . . , 104-N via a network 106. The computing devices 104-1, 104-2, . . . , 104-N may hereinafter be collectively referred to as computing devices 104, and individually referred to as a computing device 104. The computing devices 104 may include, but are not restricted to, servers, desktops, laptops, personal digital assistants, smartphones, and the like. The network 106 may be a wireless network, wired network, or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), HTTP Secure (HTTPS), Transmission Control Protocol/Internet Protocol (TCP/IP), etc., to communicate with each other.

In an implementation, the computing environment 100 may be a digital signature environment, where the system 102 may be a computing device of a signer through which a digital document can be digitally signed, and the computing device 104 may be a computing device through which the authenticity of the digitally signed document and the digital signature can be verified. Thus, the system 102 may be implemented as a signing entity and the computing device 104 may be implemented as a verifying entity. In an implementation, the system 102 may be implemented as both the signing entity and the verifying entity.

In an implementation, the system 102 includes processor(s) 108. The processor(s) 108 may be implemented as microprocessors, microcomputers, microcontrollers, digital signal processors, central processing units, state machines, logic circuitries, and/or any devices that manipulate signals based on operational instructions. Among other capabilities, the processor(s) 108 fetch and execute computer-readable instructions stored in a memory. The functions of the various elements shown in FIG. 1, including any functional blocks labeled as "processor(s)", may be provided through the use of dedicated hardware as well as hardware capable of executing non-transitory machine readable instructions. Moreover, the term processor may implicitly include, without limitation, digital signal processor (DSP) hardware, network processor, application specific integrated circuit (ASIC), field programmable gate array (FPGA), read only memory (ROM) for storing non-transitory machine readable instructions, random access memory (RAM), and non-volatile storage. Other hardware, conventional and/or custom, may also be included.

The system 102 also includes interface(s) 110. The interface(s) 110 may include a variety of machine readable instruction-based and hardware-based interfaces that allow the system 102 to interact with other devices, including web servers, data sources, and external repositories, for the purpose of generation of digital signatures and digitally signed documents. Further, the interface(s) 110 may enable the system 102 to communicate with other communication devices, such as network entities, over a communication network.

Further, the system 102 includes memory 112, operatively coupled to the processor(s) 108. The memory 112 may include any computer-readable medium, for example, volatile memory (e.g., RAM), and/or non-volatile memory (e.g., EPROM, flash memory, etc.).

Further, the system 102 includes module(s) 114 and data 116. The module(s) 114 may be coupled to the processor(s) 108. The module(s) 114, amongst other things, includes routines, programs, objects, components, data structures, and the like, which perform particular tasks or implement particular abstract data types. The module(s) 114 further include modules that supplement applications on the system 102, for example, modules of an operating system. The data 116 serves, amongst other things, as a repository for storing data that may be fetched, processed, received, or generated by the module(s) 114. Although the data 116 is shown internal to the system 102, it may be understood that the data 116 can reside in an external repository (not shown in the figure), which may be coupled to the system 102. The system 102 may communicate with the external repository through the interface(s) 110 to obtain information from the data 116.

In an implementation, the module(s) 114 of the system 102 includes a message envelope generator 118, a prefix-message envelope-suffix (PMES) message generator 120, a hash value generator 122, a digital signature generator 124, and other module(s) 126. In an implementation, the data 116 of the system 102 includes random value data 128, message data 130, digital signature data 132, and other data 134. The other module(s) 126 may include programs or coded instructions that supplement applications and functions, for example, programs in the operating system of the system 102, and the other data 134 comprise data corresponding to other module(s) 126.

The following description describes the procedure of randomization of a message for generation of a hash value and generation of a digital signature through the system 102, in accordance with an example implementation of the present subject matter. The message herein may be understood as a digital document that is to be signed with a digital signature. For the purpose of randomization of a message, the system 102 may receive the message and generate a randomized message before applying a cryptographic hash function and generating a digital signature for the message. For the purposes of the description herein, let the message be denoted by M.

Further, for the sake of clarity, certain notations used herein are explained in this paragraph. If a and b are any two bit strings, then a∥b is the concatenation of a and b. For example, if a=0001 and b=011 then a∥b=0001∥011=0001011. Further, for any bit string a, |a| denotes the length or the size of a in bits. For example, let a=10001011, then |a|=8 bits. For any bit string a and a positive integer p, $a^p$ represents the concatenation of a to itself for p times. For example, $010^{300}$ is the concatenation of bits 010 to itself 300 times. Further, for any bit string a, $a_c$ denotes the first c number of bits of a.

In an implementation, for randomization of the message M, the message envelope generator 118 obtains a random value r in a binary bit form. In an example, the random value r may be of a bit size or length of at least 128 bits and at most equivalent to a block length b of the compression function ƒ for the cryptographic hash function H. Thus, 128≤|r|≤b. The block length b of the compensation function ƒ for a standard cryptographic hash function H, such as SHA-1, SHA-256, and SHA-512, is ≥512. In the case of SHA-1 and SHA-256, b=512 bits and for SHA-512, b=1024 bits. Further, the size of the random value r, i.e., |r|, is based on the size of the hash value and is recommended to be at least half of the size of the hash value. For SHA-256, the size of the hash value is 256 bits. Thus, |r| can be of at least 128 bits. For example, r can be of size 128, 256 or 512 bits. For SHA-512, the size of the hash value is 512 bits. Thus, |r| can be of at least 256 bits. For example, r can be of size 256, 512, 768, or 1024 bits. In an example, the random value r may be generated using a random bit generator, for example, random bit generators as specified in NIST's Special Publication (SP) 800-90 standard [SP 800-90A 2012] Elaine Barker and John Kelsey, Recommendation for Random Number Generation Using Deterministic Random Bit Generators, SP 800-90A, 2012. The random value r may be stored in the random value data 128.

After obtaining the random value r, the message envelope generator 118 splits the message M into multiple message blocks $M_1, M_2, \ldots, M_L$, such that each message block $M_i$, for i=1 to L, is of a length of b−2|r| bits. In case the last message block $M_L$ is of a length less than b−2|r| bits, then the message envelope generator 118 pads up the last message block $M_L$ with a number of 0's such that the length of the last message block $M_L$ is equal to b−2|r| bits. In an example, the value of |r| should be equal to half of the size of the hash value, such that the constraint of b−2|r| bits is satisfied for splitting the message M. Thus, if |r| is more than the half of the size of the hash value and assuming that b is at least twice the size of hash value (as in SHA-1, SHA-224/256 and SHA384/512), then the first or the last b/4 bits of the random value r may be selected in order to satisfy the constraint of b−2|r| bits for splitting the message M. In an example implementation, when the size of the hash value is 256, then |r| should be at least 128 bits. In said example, if |r| is >128, then the first or the last 128 bits of the random value r may be selected in order to satisfy the constraint of b−2|r| bits for splitting the message M. Similarly, in an example implementation, when the hash value size is 512 bits, then |r| should be at least 256 bits. In said example, if |r| is >256, then the first or the last 256 bits of the random value r may be selected in order to satisfy the constraint of b−2|r| bits for splitting the message M.

After splitting the message M, the message envelope generator 118 prepends and appends each of the message blocks $M_i$ with at least a portion of the random value r. The portion of the random value r for prepending and appending with the each message block $M_i$ depends on the length of the random value r and the block length b. In this, if |r| is >b/4, then the first or the last b/4 bits of the random value r may be selected for prepending the appending with each message block $M_i$. With this, the length of each prepended and appended message block is equal to the block length b.

After this, the message envelope generator 118 concatenates the prepended and appended message blocks to obtain a structured message which is referred to as a message envelope. Referring to the notations described earlier, the message envelope can thus be depicted as $(r\|M_1\|r)\|(r\|M_2\|r)\|\ldots\|(r\|M_L\|r)$. The message envelope may be stored in the message data 130.

Further, the PMES message generator 120 concatenates the random value r to itself a predefined number of times, such that the length of the concatenated random value is equal to the block length b. Let this predefined number be denoted by a. Referring to the notations described earlier, concatenated random value is thus denoted by $r^a$. To illustrate this with an example, if b=512 and |r|=128, then a=4. In an example, if b=512 and |r|=256, then a=2. In an example, if b=512 and |r|=512, then a=1. The message envelope generator 118 then prefixes the concatenated random value $r^a$ to the message envelope.

Further, the PMES message generator 120 determines a first predefined number of bits of the concatenated random value $r^a$, where the length of the first predefined number of bits is equal to the length of the concatenated random value $r^a$ minus a number of bits required for hash function padding. Referring to the notations described earlier, the PMES message generator 120 determines $r^a{}_c$, i.e., the first c bits of $r^a$, where c is equal to $|r^a|$ minus the number of bits required for hash function padding. To illustrate this with an example, when b=512, the number of bits required for hash function padding is 65. Since for b=512, $|r^a|$=512, thus, the c=512−65=447. For said example, $|r^a{}_c|$=447.

After determining $r^a{}_c$, the PMES message generator 120 suffixes the $r^a{}_c$ to the message envelope. The message generated after prefixing and suffixing, as described above, is referred to as randomized message M'. Referring to the notations described earlier, the randomized message M' can thus be depicted as $r^a\|(r\|M_1\|r)\|(r\|M_2\|r)\|\ldots\|(r\|M_L\|r)\|r^a_c$. The randomized message M' may be stored in the message data 130.

Further, in an implementation, the hash value generator 122 may hash the randomized message M' or generate a randomized hash value by applying a predefined cryptographic hash function H on the randomized message M'. In an example, the predefined cryptographic hash function H may be a standard hash function, such as MD5, SHA-1, SHA-256, and SHA-512. The cryptographic hash function H may have a framework based on Merkle-Damgård construction [Merkle 1989, Damgård 1989] [Ralph Merkle. One way hash functions and DES. In the proceedings of Advances in Cryptology—CRYPTO'89, Lecture Notes in Computer Science, volume 435, pages 428-446, 1990] and [Ivan Damgård. A design principle for hash functions. In the proceedings of Advances in Cryptology—CRYPTO'89, Lecture Notes in Computer Science, volume 435, pages 416-427, 1990]. Further, the cryptographic hash function H may include a compression function $f$, for example, a compression function $f$ based on Davies-Meyer construction, which is a single block length block cipher based compression function.

The hashing of the randomized message M' is illustrated as:

where IV is the initialization vector used for hashing, $f$ is the compression function of the cryptographic hash function H, pad denoted the padding bits, and H(M') is the hash value of the randomized message M'. In an example, pad may denote the 65 bits required for hash function padding.

After generating the randomized hash value, the digital signature generator 124 may generate a digital signature in the form of a digital signature bit string by applying a predefined digital signature scheme on the randomized hash value H(M'). In an example, the predefined digital signature scheme may include, but is not restricted to, RSA scheme, digital signature algorithm (DSA), and elliptic curve digital signature algorithm (ECDSA). In an implementation, the randomized hash value H(M') and the digital signature bit string may be stored in the digital signature data 132.

In an implementation, the message M may be signed with the digital signature bit string. The message M, the random value r, and the digital signature bit string may be communicated to the computing device 104 for the purpose of verification of the digital signature and thus the digitally signed message.

Figure 2A:
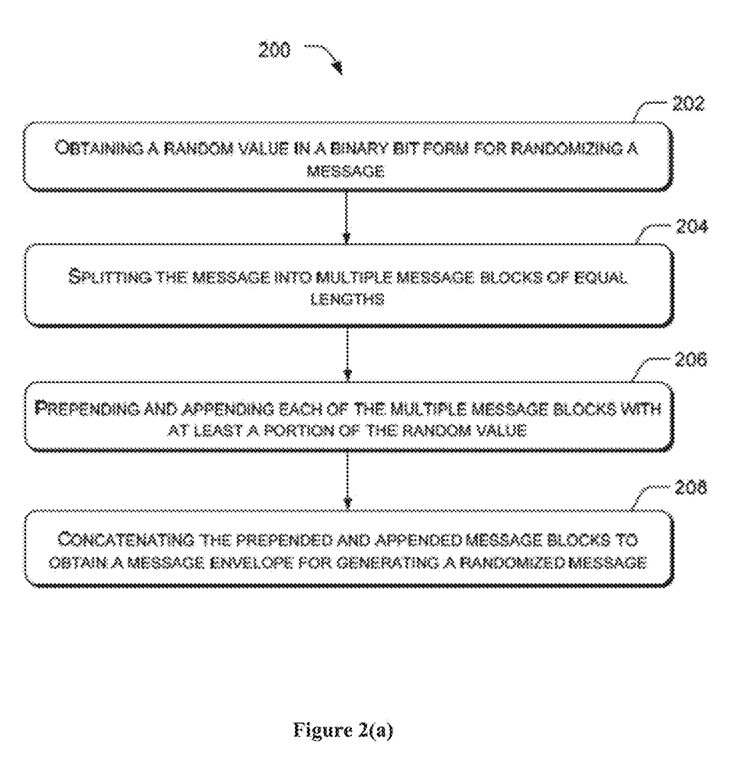
FIGS. 2(a)-2(b) illustrate a method for generating randomized messages, in accordance with an implementation of the present subject matter.
Figure 2B:
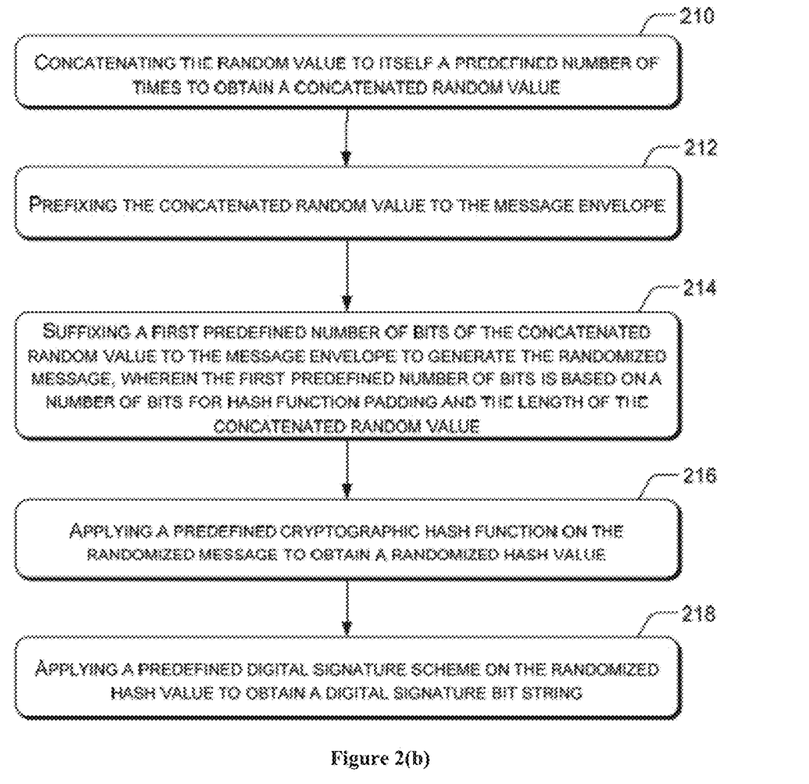

FIG. 2(a)-2(b) illustrates a method 200 for generating randomized messages, in accordance with an implementation of the present subject matter. The order in which the method 200 is described is not intended to be construed as a limitation, and any number of the described method blocks can be combined in any order to implement the method 200, or an alternative method.

Furthermore, the method 200 can be implemented by processor(s) or computing devices in any suitable hardware, non-transitory machine readable instructions, or combination thereof. It may be understood that steps of the method 200 may be executed based on instructions stored in a non-transitory computer readable medium as will be readily understood. The non-transitory computer readable medium may include, for example, digital data storage media, digital memories, magnetic storage media, such as magnetic disks and magnetic tapes, hard drives, or optically readable digital data storage media.

Further, although the method 200 may be implemented in any computing device; in an example described in FIG. 2, the method 200 is explained in context of the aforementioned system 102, for the ease of explanation.

Referring to FIG. 2(a), at block 202, a random value is obtained for randomization of a message. The random value may be in a binary bit form. The random value may be of a bit size or length of at least 128 bits and at most equivalent to a block length of the compression function for the cryptographic hash function. Further, the size of random value is recommended to be at least half of the size of the hash value. We make an assumption that the block length of the compression function is at least twice the size of the hash value as in the case of standard hash functions such as SHA-1, SHA-224/256, and SHA-384/512. In an example, the message envelope generator 118 of the system 102 may obtain the random value. In an implementation, the random value may be generated using a random bit generator.

At block 204, the message is split into multiple message blocks of equal lengths. The length is each message block is b−2|r| bits, where b is the block length of the compression function, and r is the random value. In case the last message block is of a length less than b−2|r| bits, then the last message block is padded up with a number of 0's such that the length of the last message block is equal to b−2|r| bits. Further, if |r| is more than half of the size of the hash value, i.e., >b/4, then the first or the last b/4 bits of the random value r may be selected in order to satisfy the constraint of b−2|r| bits for splitting the message. In an example, the message envelope generator 118 of the system 102 may split the message.

At block 206, each of the message blocks is prepended and appended with at least a portion of the random value. The portion of the random value for prepending and appending with the each message block is such that the length of each prepended and appended message block is equal to the block length b. For this, if |r| is >b/4, then the first or the last b/4 bits of the random value r may be selected for prepending the appending with each message block. In an example, the message envelope generator 118 of the system 102 may prepend and append the each message block with a portion of the random value.

Further, at block 208, the prepended and appended message blocks are concatenated to obtain a message envelope for further generating a randomized message. In an example, the message envelope generator 118 of the system 102 may concatenate the prepended and appended message blocks to obtain the message envelope.

Referring to FIG. 2(b), at block 210, the random value is concatenated to itself a predefined number of times. The concatenation for the predefined number of times is such that the length of the concatenated random value is equal to the block length of the compression function. Further, at block 212, the concatenated random value is prefixed to the message envelope. In an example, the PMES message generator 120 of the system 102 may concatenate the random value and prefix the concatenated random value to the message envelope.

At block 214, a first predefined number of bits of the concatenated random value are suffixed to the message envelope to generate the randomized message. The length of the first predefined number of bits of the concatenated random value is equal to the length of the concatenated random value minus a number of bits required for the hash function padding. In an example, the PMES message generator 120 of the system 102 may suffix the first predefined number of bits of the concatenated random value to the message envelope.

Further, at block 216, a predefined cryptographic hash function may be applied to the randomized message to obtain a randomized hash value. In an example, the hash value generator 122 of the system 102 may apply the predefined cryptographic hash function to obtain the randomized hash value.

Further, at block 218, a predefined digital signature scheme may be applied on the obtained randomized hash value to obtain a digital signature bit string. In an example, the digital signature generator 124 of the system 102 may apply the predefined digital signature scheme to obtain the digital signature bit string.

Although implementations for the methods and the systems have been described in language specific to structural features, it is to be understood that the present subject matter is not necessarily limited to the specific features described. For example, other methods of message randomization are possible, such as, the randomized message M'= $r^a \| (r \| M_1 \| r \| N_1) \| (r \| M_2 \| r \| N_2) \| \ldots \| (r \| r \| M_L \| r \| N_L) \| r^a_c$, where in each randomized data block has random values in two positions as shown above and data blocks $M_i$ and $N_i$ for i=1 to L in the positions as shown above. Rather, the specific features are disclosed as implementations for the methods and the systems for generating randomized messages for cryptographic hash functions.

What is claimed is:

1. A method for generating a randomized message for a cryptographic hash function, the method being implemented by a hardware processor, the method comprising:
   obtaining, by the hardware processor, a random value in a binary bit form for randomizing a message;
   splitting, by the hardware processor, the message into multiple message blocks, wherein a last message block in the multiple messages blocks is padded with bits to change the length of the last message block equal to a length of the other message blocks in the multiple message blocks when the length of the last message block is smaller than length of other message blocks in the multiple message blocks;
   prepending and appending, by the hardware processor, each of the multiple message blocks with at least a portion of the random value to ensure that the length of the prepended and appended message blocks is equal to a block length of a compression function in the cryptographic hash function;
   concatenating, by the hardware processor, the prepended and appended message blocks to obtain a message envelope for generating the randomized message;
   concatenating, by the hardware processor, the random value to itself a predefined number of times to obtain a concatenated random value to ensure that the length of the concatenated random value is equal to the block length of the compression function;
   prefixing, by the hardware processor, the concatenated random value to the message envelope;
   suffixing, by the hardware processor, a first predefined number of bits of the concatenated random value to the message envelope to generate the randomized message, wherein the first predefined number of bits is based on a number of bits for hash function padding and the length of the concatenated random value; and
   generating, by the hardware processor, a digital signature in form of a digital signature bit string based on the randomized message,
   wherein the randomized message signed with the generated digital signature bit string, the random value, and the digital signature bit string are communicated to a computing device over a network to verify the digital signature and the digitally signed randomized message.

2. The method of claim 1, wherein the length of each of the multiple message blocks is equal to the block length of the compression function minus twice the length of the random value.

3. The method of claim 1 further comprising:
   applying the cryptographic hash function on the randomized message to obtain a randomized hash value.

4. The method of claim 3 further comprising:
   applying a predefined digital signature scheme on the randomized hash value to obtain the digital signature bit string.

5. A randomized message generating system comprising:
   a hardware processor; and
   a memory coupled to the hardware processor, comprising:
   a message envelope generator coupled to the hardware processor to:
      obtain a random value in a binary bit form for randomizing a message;
      split the message into multiple message blocks, wherein a last message block in the multiple message blocks is padded with bits to change a length of the last message block equal to the length of the other message blocks in the multiple message blocks when the length of the last message block is smaller than length of other message blocks in the multiple message blocks;
      prepend and append each of the multiple message blocks with at least a portion of the random value to ensure that the length of the prepended and appended message blocks is equal to a block length of a compression function in the cryptographic hash function; and
      concatenate the prepended and appended message blocks to obtain a message envelope for generating the randomized message;
   a prefix-message envelope-suffix (PMES) message generator coupled to the hardware processor to:
      concatenate the random value to itself a predefined number of times to obtain a concatenated random value to ensure that the length of the concatenated random value is equal to the block length of the compression function;
      prefix the concatenated random value to the message envelope; and
      suffix a first predefined number of bits of the concatenated random value to the message envelope to generate the randomized message, wherein a length of the first predefined number of bits is equal to the length of the concatenated random value minus a number of bits for hash function padding; and a digital signature generator coupled to the hardware processor to:

generate a digital signature in form of a digital signature bit string based on the randomized message, wherein the randomized message signed with the generated digital signature bit string, the random value, and the digital signature bit string are communicated to a computing device over a network to verify the digital signature and the digitally signed randomized message.

6. The randomized message generating system of claim 5, wherein the length of each of the multiple message blocks is equal to the block length of the compression function minus twice the length of the random value.

7. The randomized message generating system of claim 5 further comprising a randomized hash value generator coupled to the hardware processor to generate a randomized hash value by applying the cryptographic hash function on the randomized message.

8. The randomized message generating system of claim 7 further comprising the digital signature generator coupled to the hardware processor to generate the digital signature bit string by applying a predefined digital signature scheme on the randomized hash value.

9. A non-transitory computer-readable medium having embodied thereon program instructions for executing a method for generating a randomized message for a cryptographic hash function, the method comprising:

obtaining, by a hardware processor, a random value in a binary bit form for randomizing a message;

splitting, by a hardware processor, the message into multiple message blocks, wherein a last message block in the multiple message blocks is padded with bits to change the length of a last message block equal to the length of the other message blocks in the multiple message blocks when the length of the last message block is smaller than length of other message blocks in the multiple message blocks;

prepending and appending, by a hardware processor, each of the multiple message blocks with at least a portion of the random value to ensure that length of the prepended and appended message blocks is equal to a block length of a compression function in the cryptographic hash function;

concatenating, by a hardware processor, the prepended and appended message blocks to obtain a message envelope for generating the randomized message;

concatenating, by the hardware processor, the random value to itself a predefined number of times to obtain a concatenated random value to ensure that the length of the concatenated random value is equal to the block length of the compression function;

prefixing, by the hardware processor, the concatenated random value to the message envelope;

suffixing, by the hardware processor, a first predefined number of bits of the concatenated random value to the message envelope to generate the randomized message, wherein the first predefined number of bits is based on a number of bits for hash function padding and the length of the concatenated random value; and generating, by the hardware processor, a digital signature in form of a digital signature bit string based on the randomized message, wherein the randomized message signed with the generated digital signature bit string, the random value, and the digital signature bit string are communicated to a computing device over a network to verify the digital signature and the digitally signed randomized message.

10. The non-transitory computer-readable medium of claim 9, wherein the length of each of the multiple message blocks is equal to the block length of the compression function minus twice the length of the random value.

* * * * *